Aug. 15, 1939.  H. FRÖTSCHNER  2,169,688
PHOTOGRAPHIC CAMERA
Filed Nov. 23, 1936   2 Sheets-Sheet 1

Inventor:
Hellmuth Frötschner
by B. Singer
Attorney

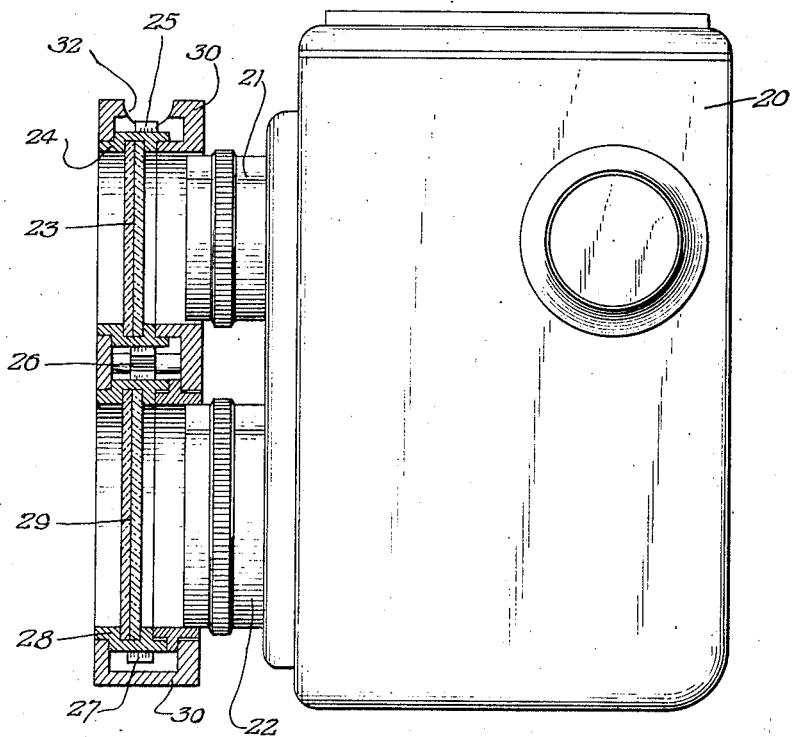

Patented Aug. 15, 1939

2,169,688

UNITED STATES PATENT OFFICE 2,169,688

PHOTOGRAPHIC CAMERA

Hellmuth Frötschner, Dresden-Laubegast, Germany, assignor to Zeiss Ikon Aktiengesellschaft, Dresden, Germany Application November 23, 1936, Serial No. 112,382
In Germany November 26, 1935

6 Claims. (Cl. 95—64)

The invention relates to improvements in photographic cameras and particularly pertains to means for eliminating disturbing light reflections when taking photographic pictures.

It is well known that light reflected onto non-metallic surfaces is partially polarized. Therefore, it is possible to eliminate to a certain degree the disturbing reflections when photographing bright objects by arranging a light polarizing filter in front of the photographic lens system. Indeed, it has been proposed heretofore to employ light polarizing means for eliminating reflections or for improving the illumination with laterally arranged extensive reflecting surfaces. There are now available light polarizing means in the form of cemented discs and foils which very conveniently may be arranged in front of the lens system of the camera. The correct position of the light polarizing means with respect to the camera is determined by observing the object to be photographed through the light polarizing means and thereby rotating the latter.

It is now an object of the invention to adjust the light polarizing means simultaneously with the adjustment of the picture area in the finder, for which purpose a light polarizing means is mounted on or in the finder.

A further object of the invention is to provide a camera with two similar polarizers, whose planes of polarization are parallel to each other, namely, one polarizer for the finder and one for the lens system and means for operatively connecting said two polarizers, so that upon adjustment of one polarizer the other is simultaneously adjusted, thereby dispensing with the necessity of reading a scale on one polarizer and adjusting the second analyzer in accordance with the scale reading of the first one.

With these and other objects in view the invention resides in certain improvements, arrangements and combinations of parts, as will be hereinafter described in connection with the accompanying drawings, the novel features being pointed out in the claims at the end of this specification:

In the drawings:

Fig. 3 is a diagrammatic side elevation view of a reflex camera provided with the polarizer arrangement of the invention, the polarizers being shown in vertical section.

Figure 1:
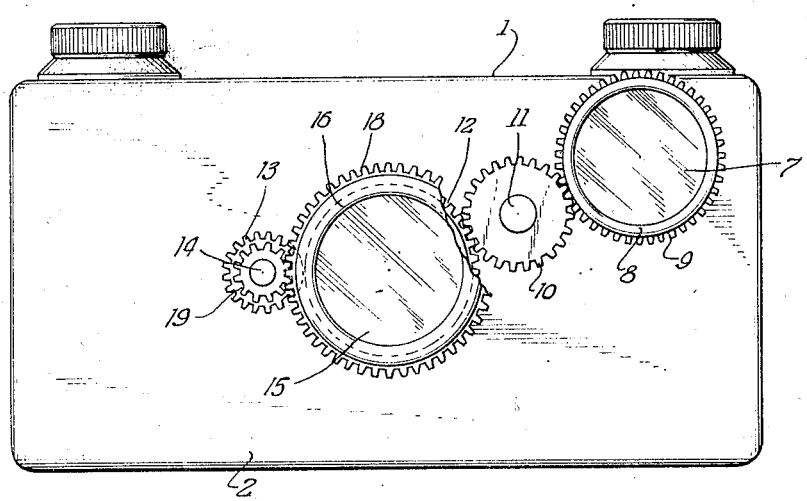
Fig. 1 is a diagrammatic front elevation view of a photographic camera illustrating one embodiment of the invention, namely the arrangement of two polarizers in front of the lens system and finder respectively.
Figure 2:
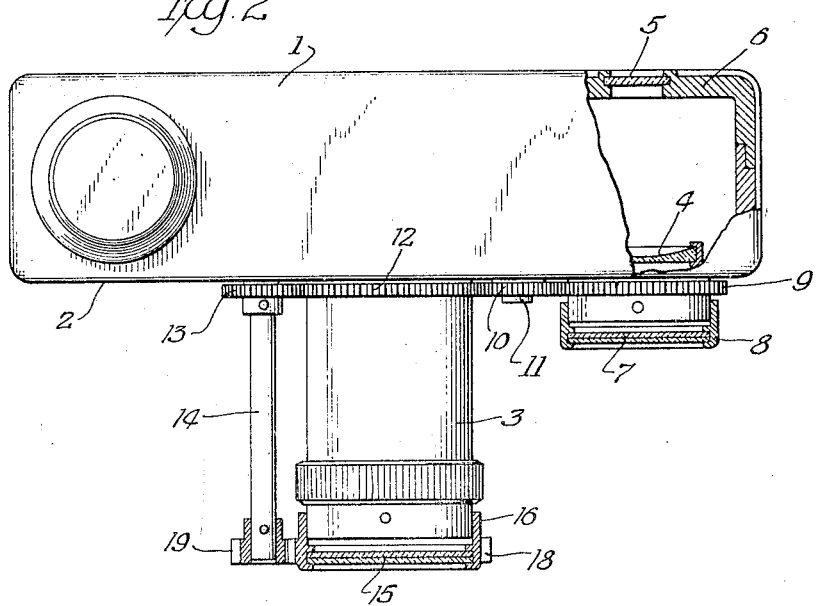
Fig. 2 is a diagrammatic top plan view of the camera illustrated in Fig. 1, a portion being shown in horizontal section to disclose the finder which is mounted in the camera casing.

In Figs. 1 and 2 the camera casing 1 supports on its front wall 2 the lens system 3. A finder lens 4 is arranged just inside the front wall 2, behind a suitable opening in the latter, and is adapted to be observed through an opening 5 in the rear wall 6 of the casing 1.

In front of the finder lens 4 is arranged a polarizer 7 secured in a mounting 8 which is rotatably supported on the outer face of the front wall 2 of the camera casing 1. The polarizer mounting 8 has secured thereto a gear 9 meshing with a gear 10 loosely supported at 11 on the front wall 2 of the casing 1 and in turn meshing with an annular gear 12 which rotatably surrounds the lens system 3. The annular gear 12 engages a gear 13 fixedly secured on a shaft 14, which is rotatably supported by the camera casing 1 and projects outwardly therefrom to terminate adjacent the front end of the lens system 3. A second polarizer 15 is mounted rotatably on the front end of the lens system 3 by means of a mounting 16 which latter is provided with gear teeth 18 meshing with a gear 19 fixed on the front end of the shaft 14. It will thus be obvious, that upon rotation of one polarizer the other one will be simultaneously rotated due to the operative connection between the polarizer mountings 8 and 16.

Fig. 3 illustrates diagrammatically the arrangement of polarizers on a reflex camera 20 provided with a finder lens system 21 positioned directly above the photographic lens system 22. The polarizer 23 in front of the finder lens system 21 is secured in a mounting 24 provided with external teeth 25 meshing with a gear 26 which also meshes with external teeth 27 on a mounting 28 which has secured therein the polarizer 29 arranged in front of the photographic lens system 22. Both mountings 24 and 28 are rotatably supported by a common casing 30 adapted to be attached and supported by the mounting or mountings of one or both of the lens systems 21 and/or 22. This casing 30 surrounds both polarizer mountings 24 and 28 including their gear teeth 25 and 27. Only the teeth 25 of the upper polarizer 23 which is positioned in front of the finder lens system 21 are made accessible for manual actuation through a recess 32 in the upper portion of the housing 30. In this last described embodiment of the invention, upon manual operation of the upper polarizer 23 the lower one positioned in front of the photographic lens system 22 is simultaneously rotated the same extent due to the operative connection 25, 26, 27 between the rotatable mountings 24 and 28.

What I claim is:

1. In combination in a camera, a camera objective, a finder, a light polarizing means mounted in front of said finder, a second light polarizing means in front of said camera objective, said two polarizing means having their planes of polarization parallel to each other and being rotatably adjustable about the axis of said finder and camera objective respectively, and means for operatively connecting said polarizing means with each other, and being effective upon rotative adjustment of one said polarizing means to adjust the other in the same direction the same angular distance.

2. In combination in a camera, a camera objective, a finder, a light polarizing means mounted in front of said finder, a second light polarizing means in front of said camera objective, said two polarizing means having their planes of polarization parallel to each other and being rotatably adjustable about the axis of said finder and camera objective respectively, and means including two gears, one for each said polarizing means and at least one gear meshing with both said two gears for operatively connecting said polarizing means with each other, and being effective upon rotative adjustment of one said polarizing means to adjust the other in the same direction the same angular distance.

3. In combination in a camera, a camera objective, a finder, a light polarizing means in front of said finder, a second light polarizing means mounted in front of said camera objective, said two light polarizing means having their planes of polarization parallel to each other and being rotatably adjustable about the axis of said finder and camera objective respectively, each said light polarizing means including an annular mounting provided with gear teeth, and a gearing operatively connecting said annular mountings with each other and adapted upon rotative adjustment of either one of said polarizing means to adjust the other in the same direction the same angular distance.

4. In combination in a camera, a camera objective, a mounting for said objective, a finder, a light polarizing means in front of said finder, a second light polarizing means in front of said camera objective, said two light polarizing means having their planes of polarization parallel to each other and being rotatably adjustable about the axis of said finder and camera objective respectively, a casing detachably mounted on the mounting of said camera objective and in which both said polarizing means are rotatably supported, and means in said casing for operatively connecting said polarizing means with each other and effective upon rotative adjustment of one of said polarizing means to adjust the other simultaneously in the same direction the same angular distance.

5. In combination in a camera, a camera objective, a mounting for said objective, a finder, a light polarizing means in front of said finder, a second light polarizing means in front of said camera objective, said two light polarizing means having their planes of polarization parallel to each other and being rotatably adjustable about the axis of said finder and camera objective respectively, a casing detachably mounted on the mounting of said camera objective and in which both said polarizing means are rotatably supported, and a gear rotatably mounted in said casing and drivingly connecting both polarizing means with each other and effective upon rotative adjustment of one of said polarizing means to adjust the other simultaneously in the same direction the same angular distance.

6. In combination in a camera, a camera objective, a mounting for said objective, a finder, a light polarizing means in front of said finder, a second light polarizing means in front of said camera objective, said two light polarizing means having their planes of polarization parallel to each other and being rotatably adjustable about the axis of said finder and camera objective respectively, a casing detachably mounted on the mounting of said camera objective and in which both said polarizing means are rotatably supported, and means in said casing for operatively connecting said polarizing means with each other and effective upon rotative adjustment of the polarizing means in front of said finder to adjust the other polarizing means arranged in front of the camera objective in the same direction the same angular distance.

HELLMUTH FRÖTSCHNER.